Dec. 29, 1970  J. P. VILLO ET AL  3,550,244
METHOD OF MAKING CODED DOWEL PINS
Filed July 11, 1967
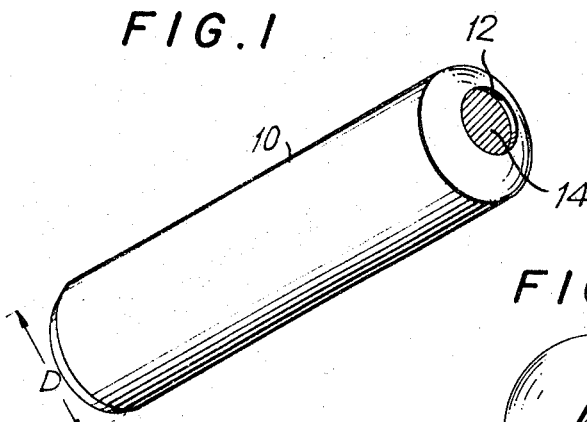
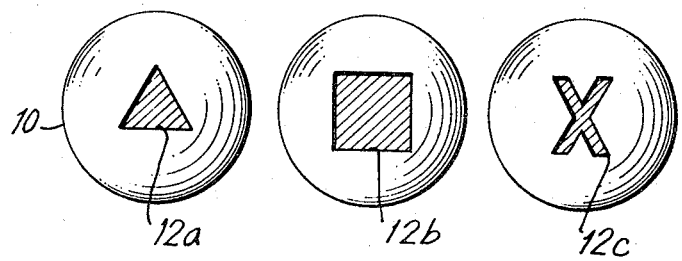
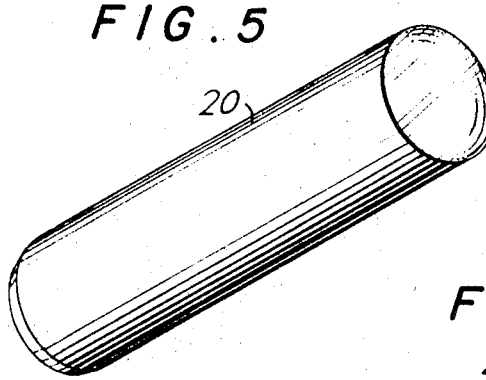
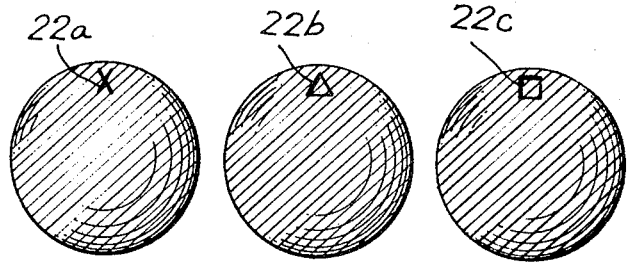
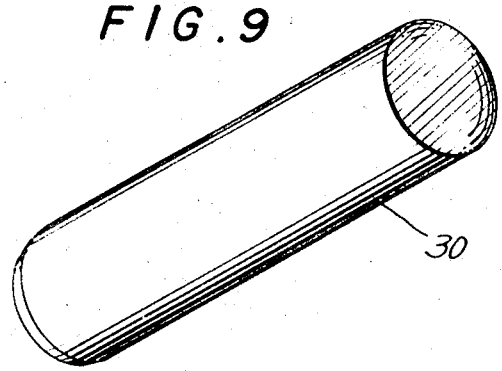
INVENTORS
JOSEPH P. VILLO
WILLIAM UTZY
BY
Curtis, Morris & Safford
ATTORNEYS

United States Patent Office 3,550,244
Patented Dec. 29, 1970

3,550,244
METHOD OF MAKING CODED DOWEL PINS
Joseph P. Villo, Rydal, and William Utzy, Hatboro, Pa., assignors to Standard Pressed Steel Co., Jenkintown, Pa., a corporation of Pennsylvania
Filed July 11, 1967, Ser. No. 652,584
Int. Cl. B23q *17/00*
U.S. Cl. 29—407                                                                 1 Claim

ABSTRACT OF THE DISCLOSURE

A dowel pin color coded to allow for a visual determination of the true diameter of the dowel and a method for coding dowel pins wherein a selected color, corresponding to a predetermined code and indicative of the true diameter of the dowel, is placed on an end of the dowel.

BACKGROUND OF THE INVENTION

This invention relates to dowel pins and more particularly to dowel pins that require an accurate determination of their diameters within restricted tolerance limits.

In industrial applications, dowel pins are used for many varied purposes, for example, as plug gages in various production operations, as guide pins and locaters on indicating machines, to align assemblies and dies, as feeler gages in assembly work, as valve plungers in hydraulic equipment, as fasteners for laminated sections of machine parts and as roller bearings in caster and truck wheels. In many of these applications dowel pins must be selected for very accurate dimensional tolerances and consequently the diameters of the dowel pins must be determined, often to within a ten thousandth of an inch, prior to their use.

To illustrate one application where close tolerances are critical, dowel pins are commonly used as locating pins to assemble mating die blocks. The dowel pins are press fitted into a receiving bore in one of the die blocks and are in turn slidably received in locating bores in the mating die block. The diameter of the receiving bore in the die blocks may vary within specified tolerance limits and it is thus necessary to have a supply of dowel pins that vary in diameter, within a corresponding tolerance range, in order to fit in the bore and yet retain a snug fit to prevent easy removal. At present, it is necessary for the machinist or die maker to use calipers and a micrometer to determine the bore diameter and then laboriously measure the diameter of numerous dowel pins until the correct diameter pin is found. This practice is time consuming and tedious and results in increased manufacturing and assembly costs.

An object of the present invention is to provide a dowel pin that is coded to give a visual indication of its true diameter.

It is a further object of this invention to provide a method for coding dowel pins so that the true diameter of the dowel pin may be determined by visual inspection.

SUMMARY OF THE INVENTION

A cold-forged dowel pin is subjected to an automatic gaging operation to accurately determine the true diameter to within a ten thousandth of an inch, and paint or dye in an appropriate color, coded to be indicative of the true diameter, is applied to the end of the dowel pin, for example, in an indentation provided in such end.

BRIEF DESCRIPTION OF THE DRAWING

Other objects, advantages and aspects of the invention will appear in the following detailed description when taken in conjunction with the accompanying drawing in which:

FIG. 1 is a perspective view showing one embodiment of the present invention wherein one end of the dowel is indented and color coded to indicate the dowel size;

FIGS. 2, 3 and 4 are end views of a dowel pin similar to the embodiment of FIG. 1 showing alternative forms of the indentation;

FIG. 5 is a perspective view of an alternative embodiment of the present invention showing a dowel pin having a plated end that is dyed with an indicative color coding;

FIGS. 6, 7 and 8 are end views of a dowel prepared in the manner of the embodiment of FIG. 5 showing the plated end with an additional indicating mark thereon; and FIG. 9 shows another embodiment that has been plated and oxidized with an appropriate metallic salt to give a plated coating of varying colors.

Referring now to FIG. 1, there is shown a dowel pin 10 that has a fixed nominal diameter D. Due to inherent limitations in the cold forging process and the finish grinding operations, by which the dowels are formed, the nominal diameter D will vary within specified tolerance limits. Thus, while the nominal diameter D may be, for example, .250 inch, the actual diameter, when accurately determined to a ten thousandth of an inch, may vary from .2501 inch to .2520 inch. To provide a means for readily determining the true diameter of the dowel a circular recess or indentation 12 is provided in one end of the dowel. A suitable paint or dye, indicated at 14, whose color is selected to correspond to a predetermined code indicative of the true diameter of the dowel, is applied within the recess. As an example of a suitable color code, a red color may be selected to indicate .0001 inch oversize, a blue color may be selected to indicate .0002 inch oversize and other suitable colors and combination of colors may be selected to indicate other dimensional variances.

FIGS. 2, 3 and 4 show other variations that may be employed to indicate the dowel size in that a triangular indentation 12a may be used to indicate another dimensional variance and appropriate colors within the triangular shape may be employed to indicate still other dimensional variances. Similarly the square 12b of FIG. 3 and the cross 12c of FIG. 4 may also be employed, with appropriate color indications, to indicate still further dimensional variances.

The dowel pins are made by a cold forging process and, after a preliminary automatic gaging step, the basic size of the dowel is determined and an appropriately shaped indentation is placed in an end of the dowel. After heat treat and final grinding, the dowel pins are loaded automatically by a hopper into an indexing machine to accurately gage the true dowel size. The dowels are then segregated by size and the desired color, corresponding to the true diameter of the dowel, is injected into the recess of the dowel pin.

Any number of colors can be used or combinations of colors depending on the establishment of the color code needed for the particular range of sizes. The colored area will not be impaired or obliterated when the dowel pin is driven into a hole since the colored area is recessed below the contact point on the dowel pin. It is thus evident that the machinist or die maker is able to determine at a glance the true diameter of the dowel pin by simply looking at the colored end of the pin itself.

In FIG. 5, there is shown another embodiment of a coded dowel pin 20. In this embodiment, the dowel pins are cadmium plated after cold forging. The longitudinal length of the dowels are finish ground to remove the cadmium plating from the shank and leave the plating only at the ends. The dowels are then automatically loaded by a hopper into an indexing machine where the true diameter of the dowels is determined and the dowels are segregated according to size. A dye, having a color indicative of the dowel's true diameter, is then applied to the cadmium plated ends. Since the cadmium plated end is very receptive to color dying, the end of the dowel will be impregnated with the dye and remain color fast throughout extensive use.

As seen in FIGS. 6, 7 and 8 appropriate markings 22a, 22b and 22c, may be placed on the end of the dowel to indicate, along with the coloring on the end, the true diameter of the dowel. As an example of the type of coding that may be used for a nominal diameter of .250 inch, a dowel having a dimension of .2500 inch may have the cadmium plated end undyed, for a dimension of .2501 inch a red dye might be used, for .2502 inch a blue dye and so on for other dimensional variances. When the dowel is .001 inch oversize an appropriate indicium like the indented X 22a in FIG. 6 may be used and the color may then be applied, red for .2511 and blue for .2512, etc., through the color code that is being used. The triangle 22b and square 22c or any other appropriate marking may also be used depending on the code chosen.

FIG. 9 shows another embodiment of a coded dowel pin wherein the dowel is prepared as in the embodiment shown in FIG. 5 by cadmium plating and then finish grinding the longitudinal length of the dowel to remove the cadmium plating from the shank. After a determination of the dowel size, the cadmium plated ends are heat treated with an appropriately selected metallic salt and become oxidized and take on a color corresponding to the characteristic color of the metallic salt. This results in a color-fast indication that will not be readily removed through repeated use.

While certain preferred embodiments of the present invention have been specifically illustrated and described, it will be understood that the invention is not limited thereto, as variations will be readily apparent to those skilled in the art, and the invention is to be given its broadest interpretation within the terms of the following claim.

What is claimed is:
1. The method of coding dowel pins to indicate the dimensional variance between the true diameter and the nominal diameter of the dowel pins comprising:
    placing a recessed indentation in at least one end of said dowel;
    plating said dowel pins with a cadmium plating receptive to color impregnation;
    removing the cadmium plating from the longitudinal sides of said dowel leaving the cadmium plating solely at the ends;
    gauging the true diameter of the dowel pins;
    segregating said gauged dowel pins according to variations in their true diameter from the nominal diameter; and
    impregnating at least said one cadmium plated end of the dowel having said indentation therein with a coloring agent whose color is preselected to be indicative of the dimensional variance of the dowel.

References Cited

UNITED STATES PATENTS

| 752,588 | 2/1904 | Rettig | 85—37 |
| 2,295,063 | 9/1942 | Tuttle | 148—6.1 |
| 2,764,886 | 10/1956 | Wiesmann | 52—105 |
| 2,900,710 | 8/1959 | Hurst et al. | 29—407 |
| 3,430,393 | 3/1969 | Landes et al. | 52—105 |

OTHER REFERENCES

Steck Mfg. Co.—Slide Fastener, Rec'd. in U.S. Pat. Office 10/56. Copy in 85/36.

DAVID KLEIN, Primary Examiner

U.S. Cl. X.R.

46—27; 52—105; 85—37; 148—6.1; 287—20.92